United States Patent [19]
Smith, Sr.

[11] 4,263,706
[45] Apr. 28, 1981

[54] METHOD AND APPARATUS FOR MACHINING DRAGLINE ASSEMBLIES

[75] Inventor: Michael W. Smith, Sr., LaGrange, Ill.

[73] Assignee: Page Engineering Company, Chicago, Ill.

[21] Appl. No.: 951,452

[22] Filed: Oct. 16, 1978

[51] Int. Cl.³ .................... B23P 19/00; B23P 23/00; B23Q 41/00; B23B 3/00
[52] U.S. Cl. ..................... 29/434; 29/445; 29/526 R; 29/560; 29/564; 82/1 C; 409/179
[58] Field of Search ............... 29/26 A, 526 R, 564, 29/650, 445, 434, 560; 409/179, 132, 178; 82/4 R, 1 C, 2 A

[56] References Cited

U.S. PATENT DOCUMENTS

| | | | |
|---|---|---|---|
| 3,145,622 | 8/1964 | Rust et al. | 409/178 X |
| 3,509,750 | 5/1970 | Anderson et al. | 409/178 X |
| 3,603,204 | 9/1971 | Anderson, Sr. | 409/179 |
| 3,687,007 | 8/1972 | Harris | 409/178 |
| 4,046,035 | 9/1977 | Barber | 409/132 X |

*Primary Examiner*—Charlie T. Moon
*Attorney, Agent, or Firm*—Wegner, Stellman, McCord, Wiles & Wood

[57] ABSTRACT

A dragline is constructed in the manufacturing plant with a segmented guide rail shimmed and secured to the plates of a tub concentric with the pintle for the deck. The guide rail is then machined so that a rolling surface is created on the rail that is within ±0.002 inches of a planar surface. Tub gear segments have mounting portions accurately machined and accurately drilled as are tub rail segments and deck rail segments accurately machined. The dragline is then disassembled, shipped to the site and re-erected with the guide rail shimmed and installed on the plates of the tub so that the rolling surface is within ±0.002 inches of a plane. The deck is mounted on the pintle and supported on columns to space the deck rail girder from the tub rail girder. A tram or boom is mounted on the deck pintle and has a machine tool carriage riding on the guide rail so that a milling head on the carriage can mill the upper and lower rail girders to within ±0.0025 inches of planar. The tub gear segments are positioned on the lower rail girder wherein the drilled holes in the segments act as a templet for a drilling head on the carriage for drilling the upper and lower rail girders. The boom and carriage are then removed. A tub rail is shimmed and secured to the tub gear segments and to the tub flanged girder to create a tub rail surface within ±0.0025 inches of planar. A deck rail is shimmed and secured to the deck rail girder to provide a surface within ±0.0025 inches of planar. An interconnected set of flanged dolly wheels are positioned between the deck rail and the tub rail as the deck is lowered into operative position on the tub.

9 Claims, 7 Drawing Figures

U.S. Patent  Apr. 28, 1981  Sheet 1 of 2  4,263,706
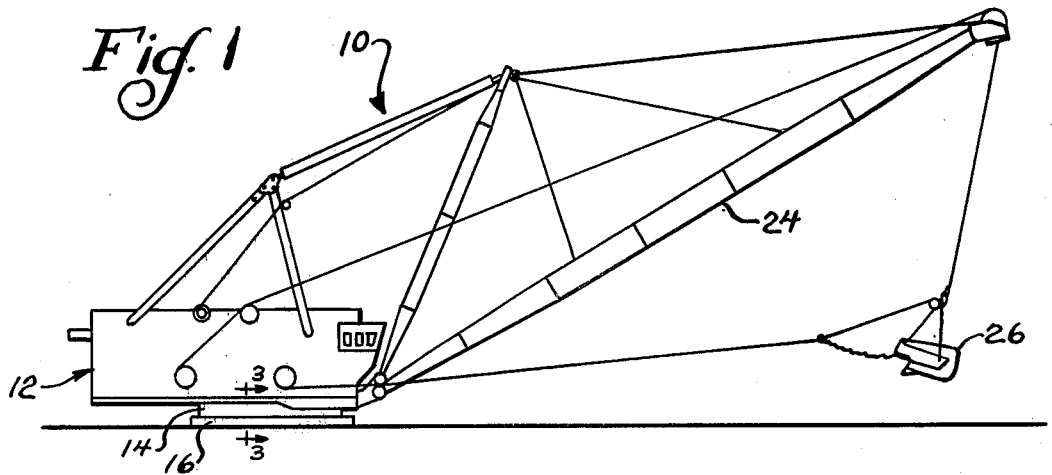
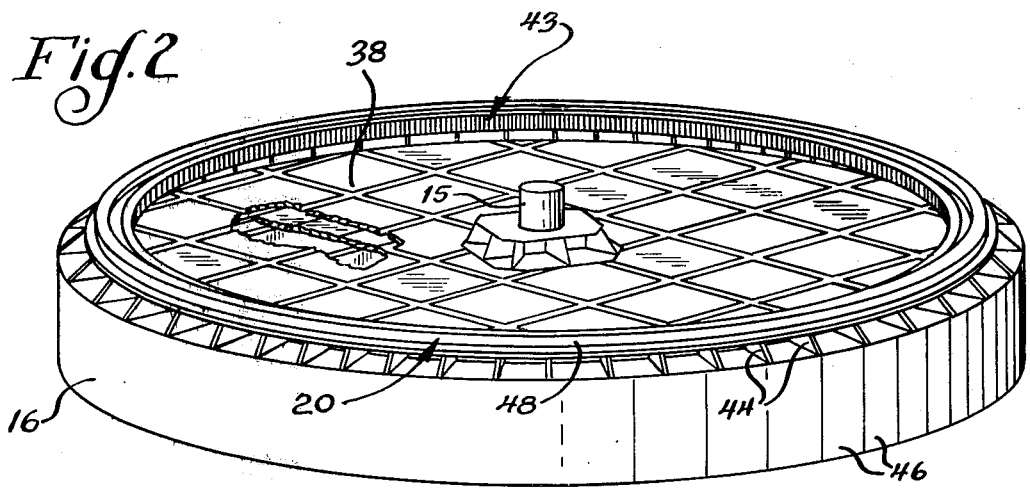
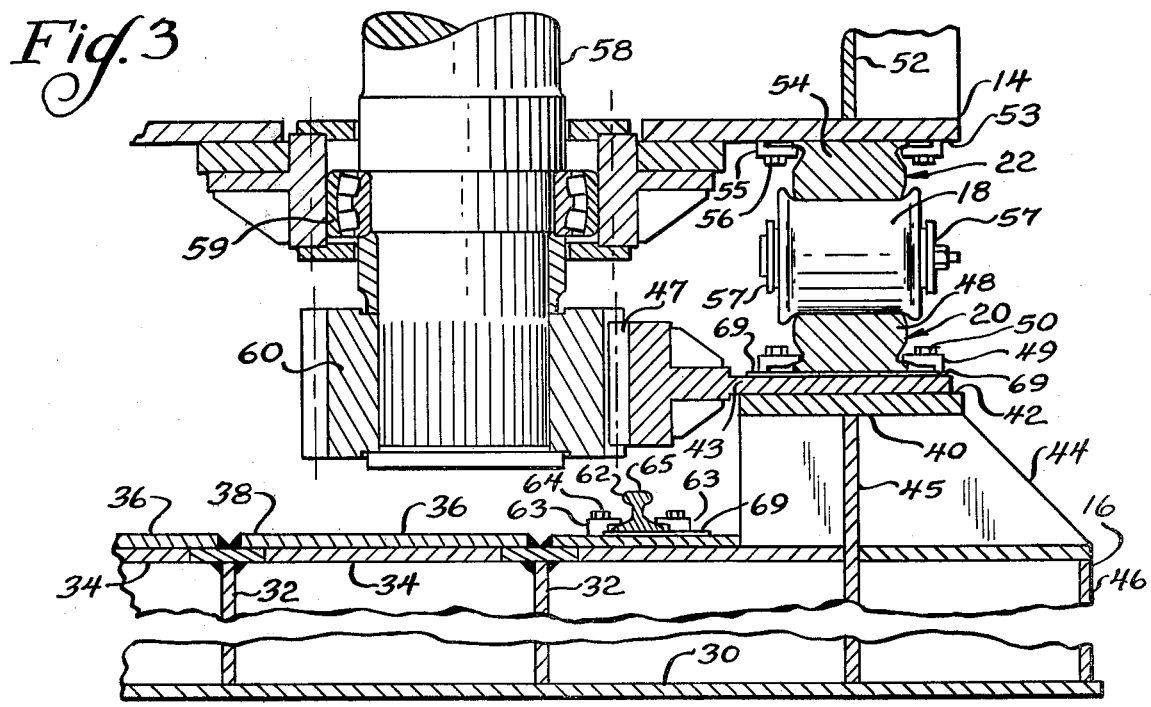

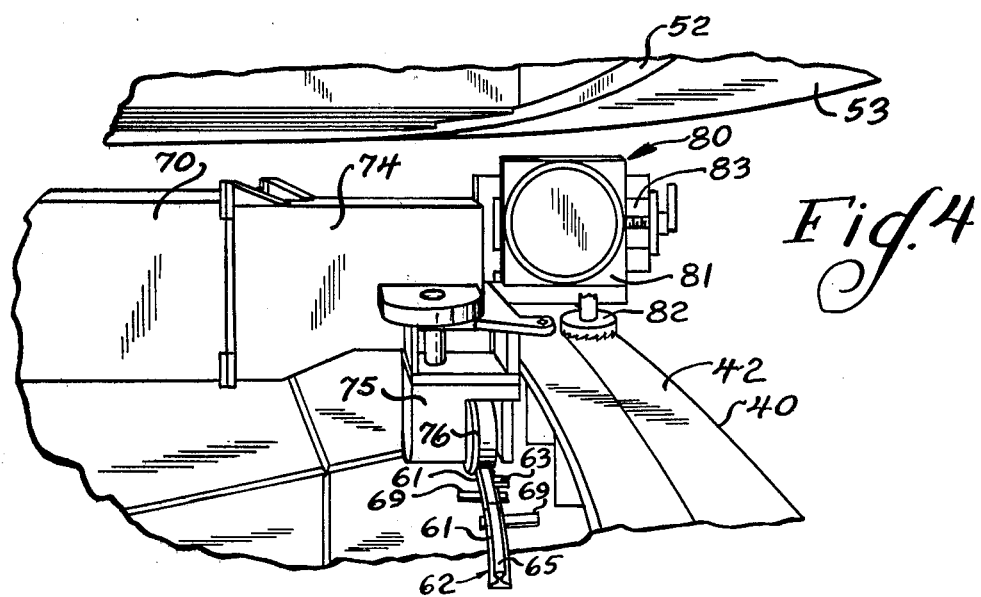
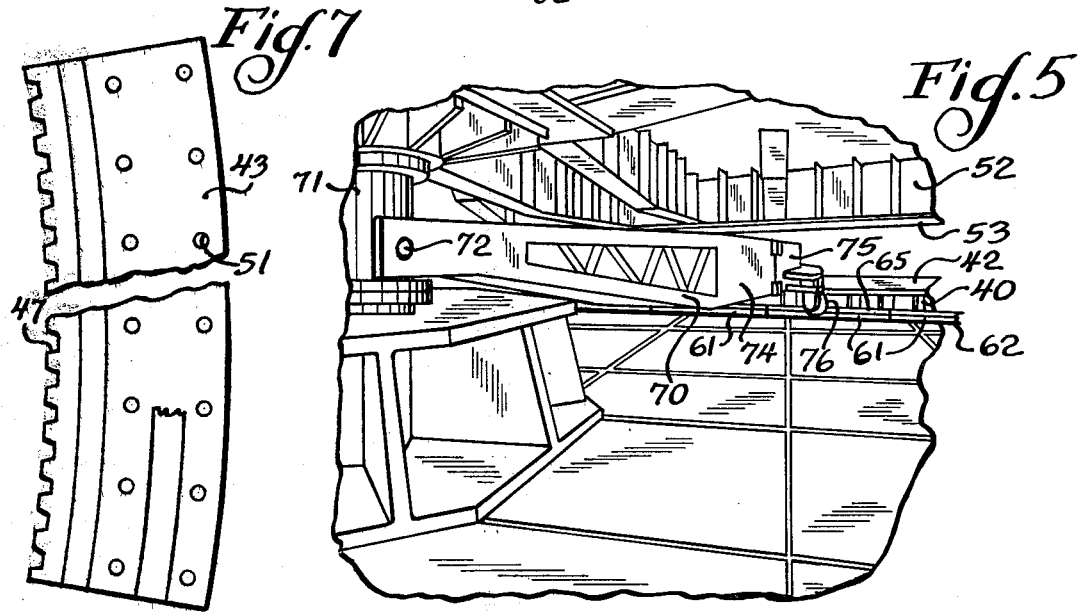
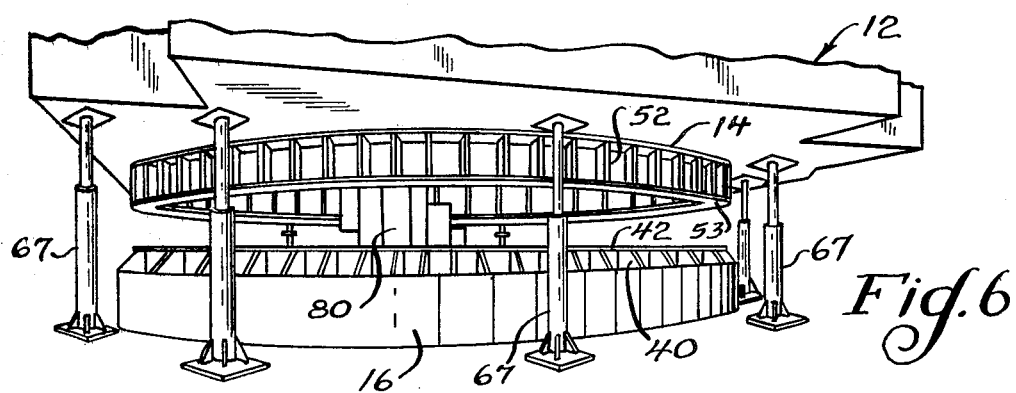

METHOD AND APPARATUS FOR MACHINING DRAGLINE ASSEMBLIES

BACKGROUND OF THE INVENTION

1. Field of the Invention

This invention relates to a dragline and, more particularly, to an improved method and apparatus for machining and assembling the tub and deck portions of the dragline.

2. Description of the Prior Art

In dragline structures and, in particular, walking draglines, the tremendous weights and loads transmitted by the deck to the tub pass through the deck rail, the flanged dolly wheels to the tub rail with the turning forces for the deck being transmitted to the gear on the tub flange. Slight or minor variations from a plane by the rolling surfaces of the tub rail or deck rail will cause galling or like problems between the rails and the dolly wheels leading to premature failure of the turning maneuverability of the deck relative to the tub. As a result, manufacturers of draglines have been forced to provide complex and time-consuming practices in an effort to assure that the rolling surfaces of the tub rail and deck rail are as close to a perfect plane as is possible to eliminate the galling problem.

Heretofore, complex systems have been and are being used to produce the planar surfaces on the rails. These systems consume as many as 1600 hours of expensive time, labor and equipment to produce the desired surface.

One such system entailed mounting a chain drive on the outside of the flanged girder to which a dolly is drivingly connected by an elongate chain and sprocket which supports a milling tool to mill the surface on the flange. The milling tool is a one-bit tool which subscribes advancing circular cuts as it advances around the flange. The key to the system is maintaining the chain and dolly in a plane.

SUMMARY OF THE INVENTION

An improved method and apparatus is provided for producing a substantially planar surface on the tub flanged girder and on the deck flanged girder so that the preground tub and deck rails attached thereto will have rolling surfaces lying in a flat plane. The whole field machining of the tub and deck flanged girders is accomplished in approximately forty hours labor and machinery and results in rolling surfaces on the assembled tub and deck rails that are substantially planar.

A tub is initially assembled at the manufacturing plant wherein a guide rail is machined to close planar tolerances as are the segments of the gear track and the tub and deck rails. The tub and rails are disassembled and shipped to the site where the tub is reconstructed with a center pintle engaging a deck which is supported temporarily on columns to hold the deck flanged girder spaced from the tub flanged girder. The guide rail is reassembled using shims to assure that its rolling surface is in a flat plane. A tram or boom is pivoted on the pintle and has a carriage rolling on the guide rail. A reversible milling head and a drilling and tapping head is carried on the carriage for milling contact with the tub flanged girder and the deck flanged girder whereby the surfaces of said girders are ground to a planar surface. The gear segments are positioned on the tub girder and the apertures therein act as templets for drilling and tapping the tub flange and the deck flange. The tub rail is assembled on the gear segments and the deck rail is assembled on the deck flange using rail clamps and fasteners. The surfaces of the tub rail and deck rail are mounted substantially planar. The tram, carriage and milling and drilling heads are removed from the tub and a ring of flanged dolly wheels are positioned on the tub rail whereupon the deck is lowered to contact the deck rail with the dolly wheels.

The milling and assembling of the tub rail, gear segments, deck rail and dolly wheels are accomplished in about forty hours as compared to 1600 hours previously. An improved apparatus is obtained at substantially lower costs.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 shows a dragline pivotally mounted on an improved milled planar tub rail and deck rail structure incorporating the invention;

FIG. 2 is a perspective view of the tub of FIG. 1 with a portion broken away;

FIG. 3 is a partial cross-sectional view taken on the line 3—3 of FIG. 1;

FIG. 4 is a partial perspective view of a milling head on the end of a boom milling the surface of the flanged girder of the tub;

FIG. 5 is a partial perspective view of the boom and milling head of FIG. 4 looking in another direction;

FIG. 6 is a perspective view of the tub and deck with the deck supported on columns as the milling of the flanged girders takes place; and, FIG. 7 is a plan view of one gear segment which is adapted to be attached to the tub flanged girder.

DESCRIPTION OF THE PREFERRED EMBODIMENT

Referring to the drawings, FIG. 1 illustrates a dragline 10 wherein a housing 12 is rigidly attached to a circular deck 14. The deck 14 and housing 12 are mounted for rotation about the axis of a pintle 15 carried by a tub 16 and by a ring of flanged dolly wheels 18 rotatably mounted between a tub rail 20 carried by the tub 16 and by a deck rail 22 carried by the deck 14. The housing 12 carries a boom 24 with appropriate structural members for operating a bucket 26 on cables suspended from the boom 24 and operated by appropriate motors, and the like, in the housing 12. The construction of the housing 12, boom 24 and bucket 26 are conventional and aside from their size and operating principles, they do not form a major portion of the present invention.

The tub 16 is comprised of a ground-engaging plate 30 which is circular in form and has a grid of upwardly extending beams 32 to the top of which are attached a plurality of plates 34. A second set of plates 36 are welded to the top of the plates 34 to add strength and rigidity to the tub 16 and to form a platform 38 on the tub. A flanged girder 40 extends upward from the plates 34 and the platform 38 and provides an upwardly facing surface 42 thereon. The flanged girder 40 is provided with a plurality of radially extending support plates 44 which extend on both sides of the web 45 of the flanged girder. Circumferential plates 46 are secured between the platform 38 and the ground-engaging plate 30 around the outer periphery of the tub 16 so as to form a cylindrical tub for the dragline 10. Mounted on the surface 42 of the upwardly facing tub girder 40 is a plurality of gear segments 43 having inwardly facing teeth 47 formed on the radial inner edge thereof. The plurality of segments 48 of the tub rail 20 are mounted on the gear segments 43 and are secured thereto by a plurality of rail clamps 49 which are bolted at 50 to the flanged girder 40 through apertures 51 in the gear segments 43.

The deck 14 has a downwardly facing flanged girder 52 having a downwardly facing surface 53 thereon, which surface aligns with and is spaced from the upwardly facing surface 42 on the flanged girder 40 of the tub 16. A deck rail 22 divided into segments 54 is secured to the surface 53 of the downwardly facing flanged girder 52 by means of rail clamps 55 bolted at 56 to the deck flanged girder 52. A plurality of flanged dolly wheels 18 are positioned between the tub rail 20 and the deck rail 22 and are interconnected by the circular ring retainers 57 on the inner and outer axial ends of the axes of the wheels. One or more drive motors (not shown) are mounted on the deck 14 and have downwardly extending drive shafts 58 extending through the floor of the deck 14. Bearings 59 are mounted below the floor of the deck 14 so as to provide rotatable support for said drive shaft 58 of the drive motor. The drive shaft 58 has a drive gear 60 keyed to the outer end portion thereof with the teeth of the gear meshing with the teeth 47 of the gear segments 43 carried by the tub flange 40. Rotation of the gear 60 by the motor will drive the housing 12 and deck 14 of the dragline 10 in a circular path about the axis of the pintle 15 with the dolly wheels 18 providing the rolling contact between the rail 22 of the deck 14 and the rail 20 of the tub 16.

My improved method and apparatus for preparing and milling the surfaces 42,53 on the upwardly facing and downwardly facing flanged girders 40,52 will now be described.

In manufacturing a dragline, a tub 16 is completely assembled on the floor of the manufacturing facility. One such tub using the principles herein set forth is roughly fifty-seven feet in diameter. The ground engaging plate 30, the beams 32 and the platform plates 34,36 will be steel plate that can be one or two inches thick. The complete tub is laid up and welded in place on the floor of the factory. A plurality of segments 61 of a guide rail 62 are positioned around the outer periphery of the platform 38 spaced inwardly from the inner reaches of the tub flanged girder 40. The segments 61 are secured to the platform 38 by rail clamps 63 and bolts 64. The rolling surface 65 of the guide rail 62 is then machined or milled to produce a contact surface that lies in a common plane with no portion of the surface of the guide rail 62 being more than ±0.002 inches out of the plane. In a separate bench operation, the gear segments 43 have the mounting portions ground or milled on both the upper and lower surfaces so as to provide planar surfaces within tolerances ±0.0025 inches. A plurality of tub rail segments 48 and deck rail segments 54 have rolling surfaces milled or ground to planar configurations, once again, in a plane with no surface deviating from the plane more than ±0.0025 inches.

The tub 16 is now disassembled and shipped to the site where it is reassembled, ready for erection of the deck 14 and dragline housing 12. The deck 14 and dragline housing 12 are supported at the center on the pintle 15 carried by the tub 16. The deck 14 is held elevated by a plurality of temporary columns 67 around the outer periphery of the tub 16 which holds the downwardly facing surface 53 of the deck flanged girder 52 substantially level and spaced from the surface 42 on the tub flanged girder 40. The segments 61 of the guide rail 62 are now reassembled on the platform 38 of the tub and rail clamps 63 and shims 69 are used between the rail 62 and the platform 38 to assure that the rolling surface 65 of the guide rail 62 is in a plane with no surface deviating more than ±0.002 inches from the plane. The planar character of the rolling surface 65 is checked by surveyor theodolite to assure accuracy.

A tram or boom 70 is now mounted on a sleeve 71 clamped for rotation on the pintle 15. The boom 70 is mounted on the pintle 15 so that its center of rotation is on the axis of the pintle. The boom 70 can pivot up and down about the axis of the pins 72 which secure the boom 70 to said sleeve 71. The outer end portion 74 of the boom 70 is supported on a trolley 75 which has wheels 76 riding on the rolling surface 65 of the guide rail 62. A milling machine 80 has a carriage 81 mounted on the trolley 75 with a milling head or cutter 82 aligned with the upwardly facing surface 42 on the tub flanged girder 40. The milling head or cutter 82 will be adjusted by the usual screw and guide arrangement 83 to contact the surface 42 for milling said surface into a plane. Once the position of the milling head 82 is set, the milling machine 80 is turned on and the head 82 begins to mill the surface 42 with the trolley 75 riding on the rolling surface 65 of the guide rail 62 to guide the head 82 to remove metal from the surface 42. On a fifty-seven foot diameter tub, the width of the surface 42 is such that it will require two passes of the milling head 82 in concentric circles with respect to the center of the pintle to mill the full width of the surface once. It has been found that two and possibly three pairs of passes will produce a surface on the flanged girder that is planar within the range of ±0.0025 inches. The first pair of milling passes may remove up to one-fourth inch of material from the girder 40. The milling head 82 is now rotated 180° so that the cutter aligns with and contacts the surface 53 of the downwardly facing flanged girder 52 of the deck 14. The boom 70 and milling machine 80 are now rotated about the axis of the pintle 15 in concentric circles to remove metal from the surface 53 of the downwardly facing flanged girder 52 until the surface of the girder lies in a plane within the range of ±0.0025 inches. The milling head 82 is now disengaged and a drill and tapping head is positioned between the flanged girders 40,53.

The gear segments 43 with the apertures 51 drilled through the flange thereof, is now laid out on the planar surface 42 of the upwardly facing flanged girder 40. Using the apertures 51 in the flange of the gear segments 43 as templets, apertures are drilled in the upwardly facing flanged girder 40 and in the downwardly facing flanged girder 52. The apertures in the girders 40,52 are now tapped whereupon the milling and drilling head 82, the boom 70 and the trolley 75 are removed from the pintle 15 and from the platform 38 of the tub.

Segments 48 of the tub rail 20 are assembled in a circle on the flanges of the gear segments 43 on the upwardly facing flanged girder 40 and rail clamps 49 and shims 69 are used with fasteners 50 through the apertures 51 to secure the tub rail 20 to the flanged girder 40 so that the rolling surface of the rail 20 is in a plane with no portion of the surface deviating more than ±0.0025 inches from the plane. The segments 54 of the deck rail 22 are now assembled with the downwardly facing flanged girder 52 by means of the rail clamps 55, shims 69 and fasteners 56 passing through the rail clamps 55 and into the tapped apertures in the flanged girder 52. Shims 69 are provided between the flanged girder 52 and the rails 22 so as to render the surface on the deck rail 22 planar within ±0.0025 inches. A ring 57 of flanged dolly wheels 18 is now placed on the tub rail 20 whereupon the columns 67 supporting the deck 14 and housing 12 are lowered so as to bring the deck rail 22 into engagement with the wheels 18 on the dolly. The columns 67 are now removed so that the deck 14 and housing 12 are pivotal about the axis of the pintle 15 with the deck rail 22 rolling relative to the flanged dolly wheels 18 and the tub rail 20. The deck 14 and housing 12 are driven with respect to the tub 16 by means of the drive shaft 58 and gear 60 engaging with the teeth 47 of the gear segments 43 as described hereinabove.

Using my improved system, the tub and deck flanged girders 40,52 of fifty-seven foot diameter are machined into a planar configuration in approximately forty hours which forty hours includes the milling, drilling, tapping and the assembly of the tub rail 20 and deck rail 22, the insertion of the dolly wheels 18 and the positioning of the deck 14 and housing 12 on the dolly wheels 18. Heretofore, comparable machining of the flanged girders took up to 1600 hours of labor and machining time and then often resulted in surfaces that were not planar, resulting in problems in operating the rotation of the dragline relative to the tub.

The guide rail is left in position on the platform of the tub and can be reused when the surfaces of the flanged girders need refacing or releveling.

I claim:

1. A dragline having a tub with an upwardly facing flanged girder around the outer periphery thereof, said tub having a network of beams with a plurality of plates on said beams forming a platform therein, an upwardly facing surface on said platform, a pintle supported by said tub and platform and extending upwardly from the center of said tub, a guide rail fastened to said surface of said platform in relatively close proximity to said flanged girder and being concentric with said flanged girder and said pintle, said guide rail being shimmed so that a rolling surface thereon lies in a plane, a boom centered on said pintle, drive means mounted on said boom in engagement with the rolling surface of said guide rail, a milling head mounted on said boom for milling a planar surface on said flanged girder using the plane of said rolling surface of said guide rail as a reference plane.

2. A dragline as claimed in claim 1 wherein a deck is mounted on said pintle and is temporarily supported in spaced relation to said tub, a downwardly facing flanged girder carried by said deck around the outer periphery thereof in alignment with and spaced above said upwardly facing girder, said milling head being reversible on said boom for milling a planar surface on said downwardly facing flanged girder.

3. A dragline as claimed in claim 2 wherein said planar surfaces on said upwardly and downwardly facing flanged girders are accurate to within ±0.0025 inches.

4. A dragline having a tub with an upwardly facing flanged girder around the outer periphery thereof, said tub having the area inside said girder built up by a network of beams and having a plurality of plates on said beams forming a platform, an upwardly facing surface on said platform, a pintle supported by said tub and platform and extending upwardly from the center of said tub, a guide rail fastened to said surface of said platform and being concentric relative to said pintle, said guide rail being shimmed so that a rolling surface thereon lies in a plane, a boom centered on said pintle, a trolley mounted on said boom and in engagement with the rolling surface of said guide rail, a milling head mounted on said boom for milling a planar surface on said flanged girder using the plane of said rolling surface of said guide rail as a reference plane, a deck mounted on said pintle and temporarily supported in spaced relation to said tub, a downwardly facing flanged girder carried by said deck around the outer periphery thereof in alignment with and spaced above said upwardly facing girder, said milling head being reversible on said boom for milling a planar surface on said downwardly facing flanged girder, a plurality of gear segments having planar surfaces on the opposite faces thereof positioned on said upwardly facing planar surface on said flanged girder, said gear segments having apertures therethrough, a drilling and tapping head mounted on said boom and having a drill and a tap for inserting in said apertures in the gear segment as a templet to guide said drill and tap in drilling and tapping apertures in said flanged girder, reversing said drill head and using said apertures in the gear segments as templates to drill and tap apertures in said downwardly facing flanged girder, positioning segments of a tub rail on said gear segments, positioning rail clamps on said gear segments in overlapping relation with said tub rail, passing fasteners through the clamps and gear segments and into the tapped apertures for positioning said tub rail on said upwardly facing girder, positioning segments of a deck rail on said downwardly facing flanged girder, positioning rail clamps on the downwardly facing flanged girder in overlapping relationship to said deck rail, and passing fasteners through said clamps and into said tapped apertures to hold the deck rail on said downwardly facing flanged girder.

5. A method of machining a planar surface on a flanged girder of a tub of a dragline, assembling a tub having an upwardly facing flanged girder around the outer periphery thereof, building a platform on said tub on the inside of said flanged girder, mounting a pintle on said platform of the tub to extend upwardly from the center of said platform, securing a guide rail to said platform in concentric relationship to said flanged girder, shimming said guide rail on said platform to produce a rolling surface thereon which lies in a common plane, pivotally mounting a boom on said pintle, mounting a trolley on said boom and in engagement with said rolling surface of the guide rail, mounting a milling machine on said trolley and having a milling head aligned with a portion of said flanged girder, and milling a planar surface on said flanged girder using said planar surface on said guide rail to guide said milling head.

6. A method of machining a planar surface on a flanged girder of a tub of a dragline, assembling a tub having an upwardly facing flanged girder around the outer periphery thereof, building a platform on said tub on the inside of said flanged girder, a pintle secured to said platform of the tub and extending upwardly from the center of said platform, securing a guide rail to said platform in concentric relationship to said flanged girder, using shims between said guide rail and said platform to produce a rolling surface thereon which lies in a common plane, pivotally mounting a boom on said pintle, mounting a trolley on said boom and in engagement with said rolling surface of the guide rail, mounting a milling machine on said trolley and having a milling head aligned with a portion of said flanged girder, milling a planar surface on said flanged girder using said planar surface on said guide rail to guide said milling head, mounting a deck on said pintle and holding same in spaced relation to said tub, positioning said deck so that a downwardly facing flanged girder on said deck is aligned with and is held in spaced relationship above said upwardly facing girder, said milling head being reversible on said boom for milling a planar surface on said downwardly facing flanged girder.

7. The method as claimed in claim 6 wherein said planar surfaces on said upwardly and downwardly facing flanged girders are accurate to within ±0.0025 inches.

8. The method as claimed in claim 6 wherein a plurality of gear segments having planar surfaces on the opposite faces thereof and having apertures therethrough are positioned on said planar surface on said upwardly facing planar surface on said flanged girder, mounting a drilling and tapping head on said boom, inserting a drill in said aperture in the gear segment as a templet to guide said drill in drilling apertures in said flanged girder, tapping said apertures in said flanged girder, reversing said drilling head and using said apertures in the gear segments as templets to drill apertures in said downwardly facing flanged girder, tapping said apertures in said downwardly facing flanged girder, positioning segments of a tub rail on said gear segments, positioning rail clamps on said gear segments in overlapping relation with said tub rail, passing fasteners through the clamps, gear segments and into the threaded apertures for positioning said tub rail on said upwardly facing girder, assembling the segments of a deck rail on said downwardly facing flanged girder, positioning rail clamps on the downwardly facing flanged girder in overlapping relationship to said deck rail, and passing fasteners through said clamps to hold the deck rail on said downwardly facing girder.

9. The method as claimed in claim 8 wherein shims are inserted between the tub rail and the gear segments to align the rolling surface of the tub rail in a plane, and shims are inserted between the deck rail and the deck flanged girder to align the rolling surface of the deck rail in a plane.

* * * * *